United States Patent [19]

Ganoung

[11] 4,342,298
[45] Aug. 3, 1982

[54] ENGINE AND TRANSMISSION CONTROL APPARATUS

[76] Inventor: David P. Ganoung, 4406 Chickasaw Rd., Memphis, Tenn. 38117

[21] Appl. No.: 170,017

[22] Filed: Jul. 18, 1980

Related U.S. Application Data

[63] Continuation-in-part of Ser. No. 20,916, Mar. 14, 1979, Pat. No. 4,280,469.

[51] Int. Cl.³ .......................... F02D 11/10; F02M 7/00
[52] U.S. Cl. .................................... 123/344; 123/352; 74/877; 74/752 D
[58] Field of Search ............... 123/1 R, 357, 344, 352; 60/396, 431; 74/877, 857, 645, 752 D

[56] References Cited

U.S. PATENT DOCUMENTS

| | | | |
|---|---|---|---|
| 3,369,360 | 2/1968 | DeBiasi | 60/396 |
| 4,005,577 | 2/1977 | Haumaier | 60/431 |
| 4,023,641 | 5/1977 | Ganoung | 180/66 R |
| 4,047,507 | 9/1977 | Noguchi | 123/357 |
| 4,280,469 | 7/1981 | Ganoung | 123/568 |

FOREIGN PATENT DOCUMENTS

665093  6/1963  Canada ............................ 123/1 R

*Primary Examiner*—Ronald B. Cox

[57] ABSTRACT

A feedback control system includes an actuator for selecting engine throttle position and another actuator for adjusting the ratio setting of an infinitely variable transmission through which the engine delivers its output power. Also included are sensors for measuring engine crankshaft speed and engine power output. When the control system is used in a passenger car, the accelerator pedal position is employed to command engine power output according to a predetermined relationship. The throttle actuator then adjusts throttle opening until the actual output as measured by the power sensor equals the commanded power output. Similarly, the transmission ratio is adjusted to establish a specific relationship between accelerator pedal position and engine crankshaft speed, but the commanded crankshaft speed is usually low enough to require full throttle engine operation to achieve the correspondingly commanded power output. When lacking an overdrive transmission ratio extreme enough to limit engine speed to the commanded value, the control system will nevertheless establish the commanded power level by closing the throttle an appropriate amount from its wide open position. Thus the control system seeks wide open throttle engine operating conditions whenever consistent with practical engine speeds and available transmission ratios.

17 Claims, 1 Drawing Figure

FIGURE-1

ENGINE AND TRANSMISSION CONTROL APPARATUS

CROSS REFERENCE TO RELATED APPLICATIONS

This application is a continuation-in-part of my co-pending application Ser. No. 020,916, filed Mar. 14, 1979, now U.S. Pat. No. 4,280,469, and entitled "Powertrain and Apparatus Using a Continuously Variable Ratio Transmission to Improve Fuel Economy."

BACKGROUND OF THE INVENTION

1. Field of the Invention

This invention relates to feedback systems used to control both the throttle valve of an internal combustion engine and the ratio setting of an associated continuously variable transmission, usually in response to the position of the accelerator pedal in a passenger car.

2. Description of the Prior Art

The prior art includes many systems for controlling the throttle setting and the transmission ratio in a passenger car equipped with a continuously variable transmission (C.V.T.). A few of these C.V.T. control systems can be recalibrated or slightly modified to implement the extensive wide open throttle engine operating schedule as advanced for improving fuel economy in U.S. Pat. No. 4,023,641. For instance, an appropriate change in cam profile will extend the invention disclosed in Canadian Pat. No. 665,093 to include a predominantly full throttle engine operating schedule. Nevertheless, such modifiable prior art systems have no provision for dealing with engine speed errors which result from a limited transmission ratio range. In other words, transmission ratio is used to limit full throttle engine operating speed, and thus also the engine power output. When the transmission reaches its most extreme overdrive ratio, however, both engine speed and power output may continue to climb well beyond their intended values. Engine power can still be regulated to the desired level, but only through bothersome manipulation of the accelerator pedal.

Recalibrated prior art systems would also have no provisions for the deviations from predominantly full throttle operation that are sometimes desirable for driveability and usually necessary for cold engine operation. Finally, the engine throttle valve is opened too abruptly relative to accelerator pedal movement when the prior art systems are modified to secure the fuel economy advantages of extensive wide open throttle engine operation.

SUMMARY OF THE INVENTION

In light of the above, it is therefore a principle object of the invention to present a C.V.T. control system which inherently follows a predominantly full throttle engine operating schedule, but which automatically reduces the engine throttle valve setting to counteract the extra power output caused by engine speeds higher than desired.

It is also an object of the invention to present a C.V.T. control system which inherently follows a predominantly full throttle engine operating schedule, but which may be conveniently adapted to automatically avoid full throttle engine operation when the engine is below its normal operating temperature range, or when driveability problems would otherwise occur.

It is another object of the invention to present a C.V.T. control system which can initiate full throttle engine operation within a fraction of the total movement of an associated accelerator pedal, but which avoids both abrupt engine response at low engine speed and sluggish response at high engine speed.

These and other objects, features and advantages will become apparent to those skilled in the art from the following detailed description when read in conjunction with the appended claims and the accompanying drawing.

In accordance with the present invention, apparatus for promoting unthrottled operation of an Otto engine which delivers its power output through a continuously variable transmission is presented. The apparatus includes a feedback control system for adjusting the ratio of the transmission to limit engine speed to a desired value. This value is selected through an input device such as the accelerator pedal in a passenger car. Also included are a control system for opening the engine throttle valve to an essentially wide open position, even at low engine speeds, and an override arrangement for closing the throttle from the wide open position in the event the transmission does not limit engine speed to the desired value. Thus the override system will automatically move the throttle to limit engine power when it is undersirable or impossible to do so with the transmission.

BRIEF DESCRIPTION OF THE DRAWING

The present invention is illustrated in the accompanying drawing, in which.

DESCRIPTION OF THE PREFERRED EMBODIMENT

Figure 1:
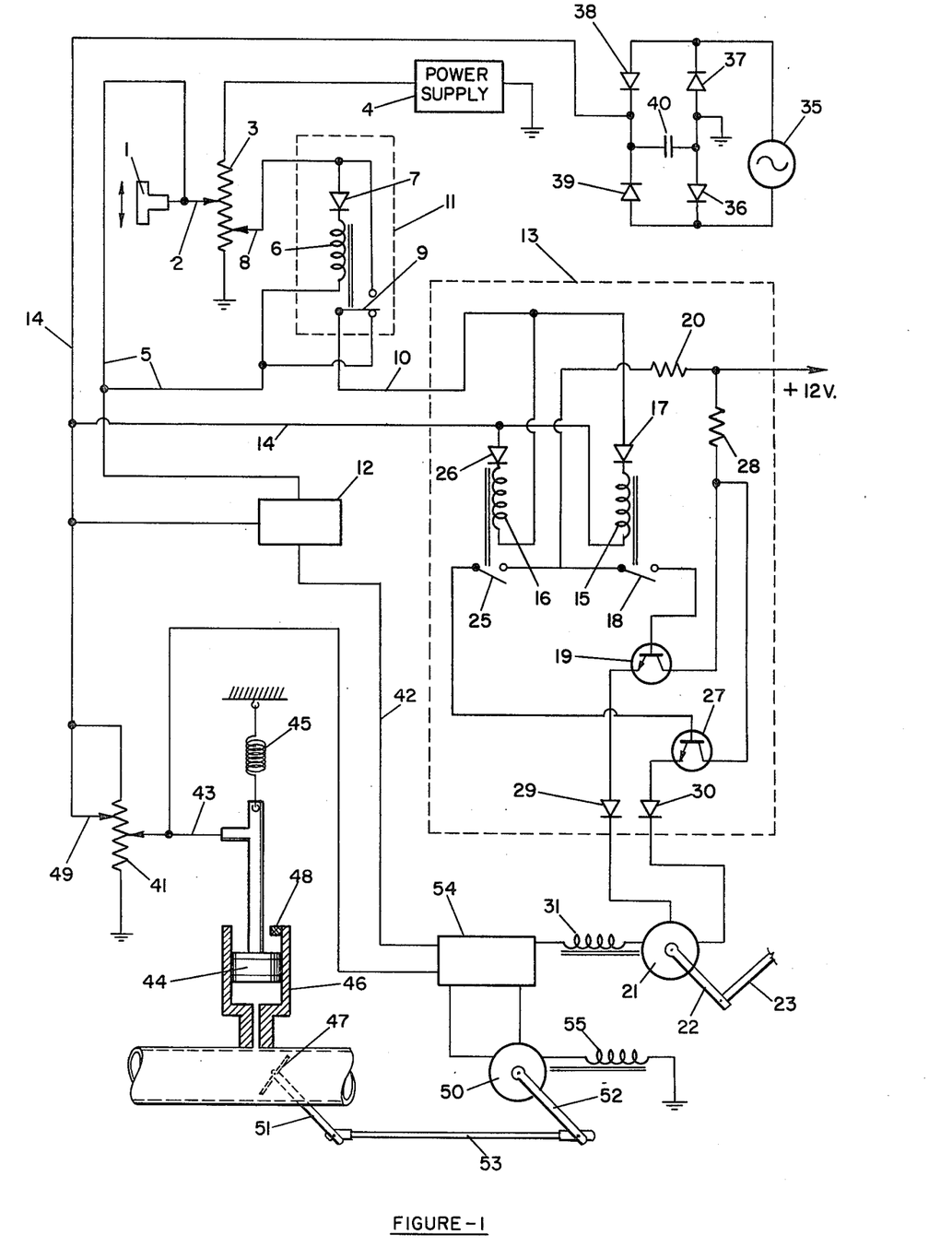
FIG. 1 is a diagram of a control system constructed according to a preferred embodiment of the invention.

The arrangement of components revealed by FIG. 1 would form a preferred embodiment of a control system according to the present invention. In the automotive application of this embodiment, the existing accelerator pedal (not shown) would be connected to move an electrically insulating input element 1 upward as the pedal is depressed. The input element 1 moves only vertically in FIG. 1 to slide an attached electrical contact 2 along an exposed resistor element 3, with which the contact 2 thereby forms a potentiometer. Progressive depression of the accelerator pedal would cause the voltage on contact 2 to progressively increase from ground potential to about 300 volts above ground because a power supply 4 is connected to apply a constant D.C. Potential of about 300 volts to the uppermost end of resistor 3, while the lower end of resistor 3 is grounded. The power supply 4 may derive its input energy from an existing vehicle storage battery (not shown) or from any other convenient source.

A branched conductor 5 carries the master command voltage signal from contact 2 to an electromagnetic coil 6, which is connected through a rectifier 7 to an auxiliary sliding contact 8 on the resistor 3. For the positions of the contacts 2 and 8 shown in FIG. 1, contact 2 will of course have a higher potential than contact 8, thereby reverse biasing rectifier 7 to prevent any current through coil 6. As a result, the force of an integral spring (not shown) will keep the double-throw switch 9 in the position shown and the command signal will be passed from conductor 5 to a conductor 10. In the event that the potential of auxiliary contact 8 exceeds that of contact 2, current will pass through rectifier 7 and coil 6 to electromagnetically pull switch 9 into the position connecting auxiliary contact 8 to conductor 10. In other words, the components within the dashed rectangle identified by reference numeral 11 act as a selector circuit connecting conductor 10 to receive the higher of the potentials on contacts 2 and 8. If the polarity of the rectifier 7 were reversed, this selector circuit 11 would select the lower of the potentials on contacts 2 and 8. The circuit 12 is such a low voltage selecting circuit, but its function will be considered later.

Conductor 10 delivers the resulting engine speed command signal to an error correction circuit, the components of which are enclosed within the dashed rectangle identified by reference numeral 13, and a branched conductor 14 brings an engine speed feedback signal to the error correction circuit 13 from a speed sensor that will be described later. As will become evident, the engine speed feedback potential on conductor 14 is substantially in direct proportion to the operating speed of the associated engine.

Within the correction circuit 13, current can pass between conductors 10 and 14 through one of two electromagnetic coils 15 and 16, depending on whether the engine speed command signal or the engine speed feedback signal has greater potential. Rectifier 17 connects coil 15 across conductors 10 and 14 with a polarity such that coil 15 will electromagnetically overcome a spring force to close an associated switch 18 when the command potential on conductor 10 exceeds the feedback potential on conductor 14 by more than a volt or two. In this case where the command signal exceeds the feedback signal, switch 18 will forward bias the base terminal of the connected power transistor 19 through the resistor 20. Transistor 19 in turn powers a winding in gear reduction motor 21 which responds by rotating an attached torque arm 22 in the downshift direction, to increase the numeral ratio of the associated continuously variable transmission (C.V.T.). Link 23 completes the connection between the motor 21 and associated C.V.T. Of course an increase in numerical transmission ratio will tend to increase the operating speed of the associated engine and thereby equalize the voltage signals on conductors 10 and 14.

The unshift coil 16, switch 25, rectifier 26 and transistor 27 are similarly active to decrease transmission ratio by powering a reverse-rotation upshift winding in motor 21 when the feedback potential on conductor 14 exceeds the command potential on conductor 10. Although not shown in FIG. 1, position switches may be used to open-circuit the appropriate one of the coils 15 and 16 when the torque arm 22 occupies the extreme positions of minimum and maximum transmission ratio. The single resistor 20 limits the base current from an existing 12 volt vehicle storage battery (not shown) to both power transistors 19 and 27 because both transistors cannot be active simultaneously. For this same reason, only the single resistor 28 limits current to both windings in motor 21, and rectifiers 29 and 30 prevent the power transistors from being damaged by reverse voltage generated in the inactive motor windings. Finally, collector current through either of the power transistors 19 and 27 must pass through an electromagnet 31 before reaching ground. This electromagnet 31 releases a brake within the motor 21 so that application of the brake greatly reduces overshoot as well as helping maintain a fixed transmission ratio when the motor 21 is not energized.

Although the switches 18 and 25 are shown for clarity in FIG. 1 as being distinct from the cores of the coils 15 and 16, electromagnetic reed switches are in fact preferred to conventional relays. With mercury-wetted contacts, reed switches have a very long lifetime, and the coils 15 and 16 may have high resistance values which reduce the effect the contacts 2 and 8 have on the voltage distribution along the resistor 3.

If a variable correction rate is desired, a second correction circuit identical in operating principle to the circuit 13 can be added. The additional circuit would power high speed windings in the motor 21, but have a reduced sensitivity to the voltage difference between the conductors 10 and 14. Or alternatively, optical couplers would allow a continuously variable correction rate because they can amplify as well as just detect potential difference between the conductors 10 and 14. The arrangement of FIG. 1 is preferred for its simplicity and reliability.

The engine speed feedback signal originates in a small A.C. generator 35 driven in direct proportion to the operating speed of the associated engine. For instance, the generator 35 may often be conveniently located in the ignition distributor of the associated engine, where the distributor shaft would drive the generator 35 at one-half of crankshaft speed. Rectifiers 36, 37, 38 and 39 comprise a full-wave bridge circuit for rectifying the current passing from generator 35 to conductor 14, and a filter capacitor 40 reduces ripple in the feedback voltage on conductor 14.

The branched conductor 14 delivers the engine speed feedback signal to a resistor 41 as well as to the engine speed correction circuit 13 just considered. Resistor 41 has a total resistance value which loads the generator 35 to cause maximum depression of the associated accelerator pedal to command the operating speed at which the associated engine develops maximum power. Or equivalently, the constant voltage delivered to resistor 3 by the power supply 4 equals the engine speed signal on conductor 14 when the engine reaches its maximum power speed. Generator 35 should be designed to provide a voltage signal on conductor 14 in direct proportion to the operating speed of the associated engine.

Just as the master command signal entered a first selector circuit 11 to emerge as the engine speed command signal, the same master signal on conductor 5 enters a second selector circuit 12 to become the engine power command signal. The selector circuit 12 connects a conductor 42 to receive the lower of the potentials on the conductors 5 and 14. A method for constructing the selector 12 has already been explained with reference to the first selector circuit 11. In all but a few transient situations, the selector 12 will connect conductor 42 to receive the potential on sliding contact 2.

An engine power feedback signal is derived from resistor 41 by a sliding contact 43 which touches the exposed element of resistor 41 and is moved vertically along the resistor 41 by an attached piston 44. A tension spring 45 pulls upward on the piston 44, and the intake manifold vacuum of the associated engine is present in a cylinder 46 to which piston 44 is fitted. Since the upper face of piston 44 experiences atmospheric pressure, increasing values of engine intake manifold vacuum on the lower face of piston 44 stretch spring 45 to reduce the resistance between ground and contact 43. The resistance value of this portion of the resistor 41 located between its ground connection and the contact 43 is in the same proportion to the total resistance of resistor 41 as the existing brake torque output of the associated engine is to the maximum torque output of the engine. Consequently, the voltage on contact 43 approximates a signal in direct proportion to the power output of the associated engine. If resistor 41 has a carbon strip element, then the width of the strip may be varied to effect the desired calibration. In the case of a wire wound resistor, the coils of the resistor may be wound on a form of appropriately varying circumference.

In more detail, the calibration of resistor 41 is accomplished as follows. First, the maximum brake torque of the associated engine is measured on a stationary dynamometer under conditions of normal engine operating temperature and the extreme open position of the throttle valve 47 which controls air flow to the associated engine. This measurement requires that the engine operating speed be varied at the extreme open throttle position to locate the maximum torque, and resistor 41 is then positioned to locate the contact 43 just at the uppermost end of the element in the resistor 41. A position limiter 48 should also be adjusted at this time to prevent further upward movement of piston 44, but the limiter 48 must not interfere with the free movement of piston 44 while the engine speed of maximum torque is being located.

The next step using the engine dynamometer includes decreasing engine operating speed by a small percentage of the difference between a slightly slow engine idling speed and the maximum torque speed just determined in the first step. At this new speed, the throttle valve 47 is closed from the wide open position until brake torque drops, from the maximum torque value first determined, by the same small percentage just applied to the specified engine speed difference. The resistance value of the portion of resistor 41 now remaining between contact 43 and the ground connection of resistor 41 should be in the same proportion to the total resistance of resistor 41 as the existing brake torque is to the maximum brake torque first determined. Finally, larger and larger percentage values are chosen to repeat this procedure until the slightly slow engine idle speed is reached, but resistor 41 should include a zero resistance segment to avoid an open circuit at contact 43 in the event vacuum in the cylinder 46 exceeds the normal value for engine idle conditions. A conventional adjustable idle stop (not shown) locates an idle position of throttle valve 47 to restore normal idle speed.

A few additional considerations influence the calibration of resistor 41 as just explained. First, any vacuum spark advance ports located in the throttle bore adjacent the throttle plate 47 should be eliminated, before calibrating the resistor 41, in favor of a transfer slot such as commonly used in the idle system of a conventional carburetor. The much more gradually increasing vacuum signal from the transfer slot will help insure that the intake manifold vacuum is higher at idle than under any slightly loaded offidle condition. Without this insurance, the engine might not always return to the normal idle speed upon decelerating the associated vehicle to a stop. Second, all of the dynamometer testing should include any dilution of the air-fuel charge that is used to improve engine operating efficiency. As an example, my U.S. Pat. No. 4,023,641 reveals that lean air-fuel mixtures can improve engine operating efficiency, and consequently, the maximum torque measured in the dynamometer testing may be distinctly less than the absolute maximum. As also disclosed in U.S. Pat. No. 4,023,641, engine design features which provide a flat torque curve over a broad engine speed range often enhance engine operating efficiency and are therefore also preferred for use with the present invention. Furthermore, a flat torque curve contributes to the accuracy with which the signal on contact 43 indicates engine power output. And finally, the throttle valve 47 follows conventional automotive practice in that the pressure drops associated with the extreme open position of the valve 47, and with any associated fuel metering components such as a venturi, total only a few inches of mercury or less, even when the associated engine is operating at maximum crankshaft speed. Although only a single throttle plate 47 is shown, the associated engine could of course be controlled by a throttle valve assembly or device with multiple bores and corresponding multiple throttle plates.

Another calibration concerns the resistor 41, and this second calibration should be done only following the calibration procedure just explained. An auxiliary sliding contact 49 shunts the engine speed signal on conductor 14 across a variable amount of the upper portion of resistor 41. As a result, extra throttling becomes available to enhance cold operation of the associated engine. The main components for controlling the position of this auxiliary contact 49 are absent from FIG. 1 because they already exist, for example, in the choke system of a conventional carburetor or the auxiliary air device used with many fuel injection systems. The calibration can be accomplished empirically, but in any case, the contact 49 should not short-circuit any portion of the resistor 41 once the associated engine reaches its normal operating temperature range. Actuation of contact 49 does reduce the voltage signal on conductor 14 at a given engine speed, but the resulting limitation on maximum engine speed is by no means undesirable during cold operation. The existing cold enrichment system on the associated engine may also be used to position contact 8 on resistor 3, to thereby permit fast idle speeds which exceed the minimum engine speed used for wide open throttle operation once the engine is warm.

. A second reversible motor 50 opens and closes the throttle valve 47 through torque arms 51 and 52 and their connecting link 53. A second error correction circuit 54 power the motor 50 in response to potential difference between the conductor 42 and the contact 43. The correction circuit 54 causes the throttle valve 47 to open when the power command signal on conductor 42 exceeds the measured power output signal on contact 43, and to close when the measured feedback signal exceeds the command signal. The method of construction already explained for the engine speed correction circuit 13 also applies to the power correction circuit 54, and an electromagnet 55 may be used to reduce control system overshoot in a manner identical to that already explained for the electromagnet 31.

In operation, the engine speed correction circuit 13 will act to equalize the command and feedback voltages on conductors 5 and 14, respectively, whenever the voltage on main contact 2 exceeds that on auxiliary contact 8. From another viewpoint, each position of the associated accelerator pedal will command a unique engine speed, provided that the pedal has been depressed far enough to raise contact 2 above contact 8, and continued depression of the pedal will command increasing engine speed. The speed correction circuit 13 causes the ratio setting of the associated continuously variable transmission to be changed until either the commanded engine speed or an extreme of the available transmission ratio range is reached.

Assuming the commanded engine speed is reached with contact 2 still above contact 8, the second correction circuit 54 will seek an effectively wide open position of the throttle valve 47 because the feedback signal residing at the very top portion of resistor 41 already equals the command signal on conductors 5 and 42. At quite low engine speeds, the contact 43 will reach the top of resistor 41 before the throttle 47 is wide open, but this allows faster response to a sudden command for significantly throttled engine operation. More importantly, the loss in engine efficiency associated with this slight throttling at low speed is usually negligible, especially if fuel injection is used. (The throttle 47 is herein defined to be effectively wide open when the resulting pressure drop and engine efficiency are essentially equal to the wide open throttle values). In addition, the stiffness of the spring 45 can be increased slightly to guarantee the availability of the actual wide open position of the throttle 47 at low engine speeds.

In contrast to the situation just considered, a limited transmission ratio range can combine with moderate driving conditions to create circumstances where the commanded engine speed cannot be reached. As an illustration of this, downhill driving might allow an existing vehicle cruising speed to be maintained by the power available from wide open throttle (w.o.t.) engine operation at only 800 r.p.m., while the available transmission ratios could not limit engine speed to below 1600 r.p.m. at the same vehicle speed. In this case, the feedback signal on conductor 14 would reach equilibrium at twice the 800 r.p.m. command signal on conductors 5 and 42. Consequently, the throttle 47 will close until contact 43 samples half the feedback voltage on conductor 14, or, until engine torque is reduced to about half the w.o.t. value.

In summary of this last example, the equilibrium engine speed exceeded the commanded value by a factor of 2, but engine power output remained at approximately the commanded value because engine torque output was reduced by this same factor of 2. Thus, the resistor 41, contact 43, piston 44 and spring 45 may be thought of as being a torque sensor. In conjunction with other components, this torque sensor reduces w.o.t. engine torque by the factor equal to the ratio of actual engine speed to commanded engine speed. Until now, the contact 43 and its associated hardware have been viewed in alliance with the engine speed sensor components as being a power sensor. Either view is correct, but the torque sensor viewpoint emphasizes the following features important in the calibration of the associated engine.

First, if the engine air-fuel charge is diluted during w.o.t. operation with the excess air of lean combustion, or with recirculated exhaust gas, then the dilution must taper off gradually as engine intake manifold vacuum increases. In other words, for example, abruptly terminating the flow of recirculated exhaust gas as soon as intake manifold vacuum first reaches, say, 5 inches of mercury would precipitate an actual increase in engine torque as the throttle 47 closed to first reach the threshold value of 5 inches of vacuum. As is almost always the case with completely conventional automotive engine calibration, more closed positions of the throttle 47 should always, at any constant engine speed, reduce engine torque output. Furthermore, the preferred engine calibration should produce an engine brake torque output that remains relatively independent of engine speed whenever intake manifold vacuum is held at any constant value less than about 15 inches of mercury. Alternatively, a true torque sensor can replace the vacuum actuated arrangement shown to provide an accurate torque signal in spite of there being no consistent relationship between torque and intake manifold vacuum.

To this point, only operation with contact 2 above auxiliary contact 8 has been considered. Without the minimum engine speed signal from contact 8, however, the apparatus of FIG. 1 would institute full throttle engine operation at unacceptably low engine speeds.

As already suggested, engine operating efficiency can be improved both by w.o.t. dilution of the air-fuel charge and with engine design characteristics which provide a flat torque curve. Both of these features also contribute to as little as about 15% of maximum engine power being available at w.o.t. and with the engine running at about 20% of the speed at which it develops its absolute maximum power output. Extensive w.o.t. operation at less that 20% of maximum engine speed typically entails undesirable vibration and even the possibility of engine damage, especially to bearings. In brief, relatively minor changes in engine design, such as using a flywheel with an increased moment of inertia, will often remove the final barriers to practical w.o.t. engine operation at only 20% of the maximum power engine speed.

Contact 8 samples from resistor 3 a voltage which would normally command the minimum practical w.o.t. operating speed, or, usually about 20% of the maximum power engine speed. The selector circuit 11 then introduces an intentional error in commanded engine speed (as compared with the value which would force w.o.t. operation) whenever the commanded value on contact 2 is less than the minimum value practical for w.o.t. operation. As already explained with reference to downhill driving and limited transmission ratios, the effect of an engine speed error is to initiate throttling, but without introducing significant error between the actual and the commanded power output. In this way, throttling plays a major part in establishing engine power levels less than about 15% of the maximum. On the other hand, throttling is not used when both more than 15% of power is commanded and the associated transmission is able to limit engine speed to the commanded value.

Driveability considerations, as well as cold engine temperatures, can have an influence on the minimum engine speed commanded by contact 8. For instance, if higher vehicle speeds are found to be incompatible with the normal minimum w.o.t. engine speed, then the contact 8 can be moved upward as a function of increasing vehicle speed. In addition, intentional engine speed errors can be introduced at other points in the apparatus as a function of driveability parameters continually being monitored by sensors.

Below the normal range of engine temperatures, full throttle engine operation might often be impractical. During cold engine operation, therefore, movement of the contact 49 down resistor 41 allows the voltage signals on conductors 14 and 42 to be equalized well before the throttle 47 reaches its wide open position. If, however, the accelerator pedal is suddenly depressed, the voltage on contact 2 will temporarily rise above that on contact 49. Without the low voltage selector circuit 12, the voltage on conductor 42 would also rise above the voltage on contact 49, causing the throttle 47 to be momentarily opened past the limiting position dictated by contact 49 during steady-state conditions. The selector circuit 12 thus serves its purpose only during transient conditions when the engine is cold.

Sudden accelerator pedal movements may similarly trigger only momentary opening or closing of the throttle 47 during the period when the correction circuit 13 is seeking the newly commanded engine speed. Such dynamic behavior of the system simply imparts a more responsive feel to the associated accelerator pedal.

The throttle 47 must traverse the entire range from idle to w.o.t. during a quite abbreviated portion of the total travel of the associated accelerator pedal. Again, this is because a maximum of only about 15% of engine power is always developed with throttling. As a result of the abbreviated pedal travel, a conventional mechanical throttle linkage with amplified movement would open the throttle 47 to cause an abrupt rise in engine torque at low engine speeds. Since a given small throttle opening establishes much less torque at higher engine speeds, a mechanical linkage will have either low speed abruptness or lack of response at high speed. Because the present invention opens the throttle 47 in response to measured torque, this compromise is totally avoided.

Most gasoline engine fuel injection systems control engine torque output by varying the time width of the pulses used to actuate the fuel injectors. When such a torque signal (in this case, more closely approximating indicated than brake torque) is already available, the sensor which includes resistor 41 and contact 43 could be eliminated. Going further, a mechanical linkage could position the throttle valve 47, regardless of the disadvantage just noted. And finally, an override mechanism could close the throttle from the position determined by the mechanical linkage to a new position causing the injector pulse width (torque signal) to be reduced by a factor equal to the ratio of measured to commanded engine speed. This example helps illustrate the great many variations of the present invention that may be resorted to without departing from the spirit and scope of the following claims.

What is claimed is:

1. Apparatus for promoting unthrottled operation of an engine which is controlled by a throttle valve device and which delivers power to a load through a continuously variable ratio transmission, said apparatus comprising:
    input means for selecting the desired operating speed of the engine,
    ratio control means operative to adjust the ratio of the transmission to thereby substantially eliminate the difference between said desired engine operating speed and the actual operating speed of the engine,
    first throttle control means operative to open the throttle device to an effectively wide open position when both (1) the actual operating speed of the engine substantially equals said desired engine operating speed and (2) the operating speed of the engine exceeds the minimum value practical for wide open throttle operation of the engine,
    and second throttle control means operative to close the throttle device from an effectively wide open position when both (1) the ratio of the transmission is maintained at a constant value and (2) the actual operating speed of the engine significantly exceeds said desired engine operating speed;
    whereby the reduction in engine power output due to the operation of said second throttle control means counteracts increases in power output due to engine speeds which exceed said desired value.

2. The apparatus of claim 1 wherein said input means includes means for selecting the desired operating power output from the engine and wherein said second throttle control means includes means operative to close the throttle device until the actual power output from the engine is reduced to substantially equal said desired engine power output.

3. The apparatus of claim 2 wherein (1) said input means provides a variable engine speed command signal and a variable engine power command signal, (2) said ratio control means includes means for providing a measured engine speed signal dependent upon the actual operating speed of the engine, (3) said ratio control means is operative to adjust the ratio of the transmission to thereby substantially equalize said measured engine speed signal and said engine speed command signal (4) said second throttle control means includes power sensing means for providing a measured power signal dependent upon the actual power developed by the engine, and (5) said second throttle control means is operative to close the throttle device until the value of said measured power signal is thereby reduced to substantially equal the value of said power command signal.

4. The apparatus of claim 3 wherein said power sensing means provides, over the majority of operating conditions of the engine, said measured power signal substantially in direct proportion to the actual brake power developed by the engine, whereby power output remains substantially constant in spite of the actual engine speed not being equal to the commanded value.

5. The apparatus of claim 3 wherein said first throttle control means includes (1) said power sensing means for providing said measured power signal and (2) means operative to open the throttle device to thereby raise the value of said measured power signal to substantially equal the value of said power command signal.

6. The apparatus of claim 1 wherein said second throttle control means includes means for providing a measured torque signal dependent upon the actual brake torque developed by the engine and wherein said input means includes means for providing a torque command signal substantially equal to the product of (1) the value of said measured torque signal that results from unthrottled operation of the engine at its existing operating speed and (2) the ratio of the existing value of said desired engine operating speed to the actual operating speed of the engine, said second throttle control means further including means operative to close the throttle device until the value of said measured torque signal is thereby reduced to substantially equal the value of said torque command signal.

7. The apparatus of claim 6 wherein said first throttle control means includes (1) said means for providing said measured torque signal and (2) means operative to open the throttle device to thereby raise the value of said measured torque signal to substantially equal the value of said torque command signal.

8. The apparatus of claim 7 wherein (1) said input means provides a variable engine speed command signal, (2) said ratio control means includes means for providing a measured engine speed signal dependent upon the actual operating speed of the engine, (3) said ratio control means is operative to adjust the ratio of the transmission to thereby substantially equalize said measured engine speed signal and said engine speed command signal, and (4) said torque command signal is equal to the product of (1) the value of said measured torque signal that results from unthrottled operation of the engine at its existing operating speed and (2) the ratio of the existing value of said engine speed command signal to the existing value of said measured engine speed signal.

9. Apparatus for promoting unthrottled operation of an engine which is controlled by a throttle valve device and which delivers power to a load through a continuously variable ratio transmission, said apparatus comprising:
power command means for selecting the desired power output from the engine,
throttle control means operative to adjust the throttle valve device to thereby substantially eliminate the difference between said desired power output and the actual power output developed by the engine,
speed command means for selecting the desired operating speed of the engine, said desired engine operating speed being substantially equal to the actual engine operating speed that results when both (1) the actual power output developed by the engine equals the existing value of said desired engine power output and (2) the throttle device is effectively wide open,
and ratio control means operative to adjust the ratio of the transmission to thereby substantially eliminate the difference between said desired engine operating speed and the actual operating speed of the engine,
whereby errors between the actual engine speed and said desired engine speed do not alter the selected power level, but full throttle engine operation is usually selected automatically when said errors do not exist.

10. The apparatus of claim 9 wherein (1) said power command means provides a variable power command signal, (2) said throttle control means includes power sensing means for providing a measured power output signal dependent upon the actual brake power developed by the engine, (3) said throttle control means is operative to adjust the throttle device to thereby substantially equalize said measured power signal and said power command signal, (4) said speed command means provides a variable speed command signal, (5) said ratio control means includes speed sensing means for providing a measured speed signal dependent upon the actual operating speed of the engine and (6) said ratio control means is operative to adjust the ratio of the transmission to thereby substantially equalize said measured speed signal and said speed command signal.

11. The apparatus of claim 10 further comprising (1) means for providing a minimum speed command signal substantially equal to the value of said measured speed signal that exists when the engine operating speed is at the minimum level practical with the throttle device effectively wide open and (2) means operative, when said minimum speed command signal exceeds said variable engine speed command signal, to disable the operation of said ratio control means and to adjust ratio of the transmission to thereby equalize said measured speed signal and said minimum speed command signal,
whereby full throttle engine operation at undesirably low engine speeds is avoided, but without disturbing the commanded power level.

12. The apparatus of claim 10 further comprising cold start means operative to increase the value of said measured engine speed signal relative to the actual brake power developed by the engine, whereby full throttle operation may be avoided when the engine is cold.

13. The apparatus of claim 11 wherein said power sensing means includes said speed sensing means and a torque sensing means for reducing said measured speed signal when the throttle device significantly reduces the brake torque developed by the engine.

14. The apparatus of claim 13 wherein said torque sensing means is actuated by the air density downstream of the throttle device.

15. The apparatus of claim 13 wherein said speed sensing means provides said measured speed signal substantially in direct proportion to the operating speed of the engine.

16. The apparatus of claim 15 wherein said power sensing means provides said measured power signal substantially in direct proportion to the brake power developed by the engine, whereby power output remains substantially constant in spite of the actual engine speed not being equal to the commanded value.

17. The apparatus of claim 15 wherein said speed command means includes said power command means and wherein said power command signal equals said speed command signal, whereby said apparatus may be simplified.

* * * * *

UNITED STATES PATENT AND TRADEMARK OFFICE
CERTIFICATE OF CORRECTION

PATENT NO. : 4,342,298

DATED : August 3, 1982

INVENTOR(S) : David P. Ganoung

It is certified that error appears in the above-identified patent and that said Letters Patent is hereby corrected as shown below:

The title page showing the illustrative figure should be deleted to appear as per attached page.

Sheet 1 of the drawing should be deleted to appear as per attached sheet.

Signed and Sealed this

Thirty-first Day of January 1984

[SEAL]

Attest:

Attesting Officer

GERALD J. MOSSINGHOFF

Commissioner of Patents and Trademarks

United States Patent [19]

Ganoung

[11] 4,342,298
[45] Aug. 3, 1982

[54] ENGINE AND TRANSMISSION CONTROL APPARATUS

[76] Inventor: David P. Ganoung, 4406 Chickasaw Rd., Memphis, Tenn. 38117

[21] Appl. No.: 170,017

[22] Filed: Jul. 18, 1980

Related U.S. Application Data

[63] Continuation-in-part of Ser. No. 20,916, Mar. 14, 1979, Pat. No. 4,280,469.

[51] Int. Cl.³ .................... F02D 11/10; F02M 7/00
[52] U.S. Cl. ............................ 123/344; 123/352; 74/877; 74/752 D
[58] Field of Search .......... 123/1 R, 357, 344, 352; 60/396, 431; 74/877, 857, 645, 752 D

[56] References Cited

U.S. PATENT DOCUMENTS

| | | | |
|---|---|---|---|
| 3,369,360 | 2/1968 | DeBiasi | 60/396 |
| 4,005,577 | 2/1977 | Haumaier | 60/431 |
| 4,023,641 | 5/1977 | Ganoung | 180/66 R |
| 4,047,507 | 9/1977 | Noguchi | 123/357 |
| 4,280,469 | 7/1981 | Ganoung | 123/568 |

FOREIGN PATENT DOCUMENTS

665093  6/1963  Canada ........................ 123/1 R

*Primary Examiner*—Ronald B. Cox

[57] ABSTRACT

A feedback control system includes an actuator for selecting engine throttle position and another actuator for adjusting the ratio setting of an infinitely variable transmission through which the engine delivers its output power. Also included are sensors for measuring engine crankshaft speed and engine power output. When the control system is used in a passenger car, the accelerator pedal position is employed to command engine power output according to a predetermined relationship. The throttle actuator then adjusts throttle opening until the actual output as measured by the power sensor equals the commanded power output. Similarly, the transmission ratio is adjusted to establish a specific relationship between accelerator pedal position and engine crankshaft speed, but the commanded crankshaft speed is usually low enough to require full throttle engine operation to achieve the correspondingly commanded power output. When lacking an overdrive transmission ratio extreme enough to limit engine speed to the commanded value, the control system will nevertheless establish the commanded power level by closing the throttle an appropriate amount from its wide open position. Thus the control system seeks wide open throttle engine operating conditions whenever consistent with practical engine speeds and available transmission ratios.

17 Claims, 1 Drawing Figure

FIGURE-1